US007865294B2

(12) United States Patent
Mathews et al.

(10) Patent No.: US 7,865,294 B2
(45) Date of Patent: Jan. 4, 2011

(54) METHOD FOR REGULATING THE LAMBDA VALUE OF AN INTERNAL COMBUSTION ENGINE

(75) Inventors: Bejoy Mathews, Vaterstetten (DE); Gerd Rösel, Regensburg (DE); Hong Zhang, Tegernheim (DE)

(73) Assignee: Continental Automotive GmbH, Hannover (DE)

( * ) Notice: Subject to any disclaimer, the term of this patent is extended or adjusted under 35 U.S.C. 154(b) by 369 days.

(21) Appl. No.: 11/665,517

(22) PCT Filed: Sep. 16, 2005

(86) PCT No.: PCT/EP2005/054605

§ 371 (c)(1), (2), (4) Date: Oct. 31, 2008

(87) PCT Pub. No.: WO2006/040236

PCT Pub. Date: Apr. 20, 2006

(65) Prior Publication Data

US 2009/0088943 A1 Apr. 2, 2009

(30) Foreign Application Priority Data

Oct. 14, 2004 (DE) ...................... 10 2004 050 092

(51) Int. Cl.
*G06F 19/00* (2006.01)
*F02D 41/14* (2006.01)
*G01M 15/00* (2006.01)

(52) U.S. Cl. ...................... 701/109; 701/114; 123/674; 123/688; 123/696; 73/114.72

(58) Field of Classification Search ................ 123/479, 123/674, 679, 680, 690, 693–696; 701/101–103, 701/109, 114; 73/32.32, 114.71–114.73; 60/274, 276
See application file for complete search history.

(56) References Cited

U.S. PATENT DOCUMENTS

| | | | | |
|---|---|---|---|---|
| 4,492,205 | A * | 1/1985 | Jundt et al. | 123/688 |
| 4,933,863 | A * | 6/1990 | Okano et al. | 701/114 |
| 5,438,827 | A | 8/1995 | Ohuchi et al. | |
| 5,462,040 | A * | 10/1995 | Krebs et al. | 123/688 |
| 5,730,112 | A | 3/1998 | Jeong | |
| 5,906,185 | A | 5/1999 | Ishida et al. | |
| 5,970,960 | A * | 10/1999 | Azuma | 123/568.12 |

(Continued)

FOREIGN PATENT DOCUMENTS

DE 25 45 759 C2 4/1977

(Continued)

*Primary Examiner*—Willis R Wolfe, Jr.
(74) *Attorney, Agent, or Firm*—King & Spalding L.L.P.

(57) ABSTRACT

The invention relates to a method for regulating the lambda value of an internal combustion engine with a catalytic converter for subsequently treating the exhaust gases of the internal combustion engine, with a binary lambda probe, which is mounted upstream from the catalytic converter and which senses the composition of the exhaust gases. According to the invention, the lambda set value is superimposed with a lean/rich amplitude. This lean/rich amplitude has an integral component and a discontinuous component leading back to the lambda set value. When a change that differs from the change in the exhaust gas composition caused by the lean/rich amplitude is detected, the coefficient of the integral component is modified and/or a discontinuous component is added to the integral component or subtracted therefrom.

8 Claims, 3 Drawing Sheets

U.S. PATENT DOCUMENTS

| | | | | |
|---|---|---|---|---|
| 6,138,638 | A * | 10/2000 | Morikawa | 123/690 |
| 6,148,611 | A * | 11/2000 | Sato | 123/680 |
| 6,880,380 | B2 * | 4/2005 | Nagashima et al. | 73/23.32 |

FOREIGN PATENT DOCUMENTS

| | | | |
|---|---|---|---|
| DE | 30 39 436 | C2 | 5/1982 |
| DE | 41 34 349 | C2 | 4/1993 |
| DE | 197 28 926 | C1 | 1/1999 |
| DE | 102004050092 | B3 | 4/2006 |
| WO | WO 90/05240 | A1 | 5/1990 |
| WO | WO 2006/040236 | A1 | 4/2006 |

* cited by examiner

METHOD FOR REGULATING THE LAMBDA VALUE OF AN INTERNAL COMBUSTION ENGINE

CROSS REFERENCE TO RELATED APPLICATIONS

This application is the US National Stage of International Application No. PCT/EP2005/054605, filed Sep. 16, 2005 and claims the benefit thereof. The International Application claims the benefits of German application No. 10 2004 050 092.4 filed Oct. 14, 2004, both of the applications are incorporated by reference herein in their entirety.

FIELD OF INVENTION

The invention relates to a method for regulating the lambda value of an internal combustion engine with a catalytic converter for subsequently treating the exhaust gases and with a binary lambda probe which is arranged upstream of the catalytic converter, with a lean/rich amplitude superimposing the lambda target value.

BACKGROUND OF THE INVENTION

With a regulator of this type, preferably a cascade regulator, the exhaust gas composition is sensed using the lambda probe arranged upstream or downstream of the catalytic converter and the injection quantity of the fuel supply of the internal combustion engine is correspondingly controlled so that the desired exhaust gas composition can finally be reached again. This ensures that the lambda value lies within a desired range, as a result of which the content of HC, NOX and CO is reduced to a minimum.

The exhaust gas emission values are dependent here on the control speed of the regulating circuit, in particular in the warm-up phase of the internal combustion engine.

With regulating methods having two binary lambda probes, one is arranged upstream of the catalytic converter and the other is arranged downstream of the catalytic converter in the flow direction of the exhaust gas. The voltage of the binary lambda probe upstream of the catalytic converter is converted into an item of binary information, which specifies whether this currently concerns an enriched or a lean exhaust gas concentration. A value is determined on the basis of this item of information, with which value the injected fuel quantity in the fuel supply of the internal combustion engine is controlled. If the lambda probe upstream of the catalytic converter senses a lean exhaust gas composition, the value of the mixture formation is reduced step-by-step from a value of $\lambda=1.0$ to a value of 0.98 . . . 0.97, until the lambda probe senses a status of the rich exhaust gas composition. As a result of recognizing the rich exhaust gas composition, the value of the mixture formation is now increased by an increment to $\lambda=1.0$ and subsequently step-by-step to 1.02-1.03. The step-by-step increase and/or drop in the lambda value is referred to as an integral component and the abrupt feedback of the lambda value is referred to as a discontinuous component. This cycle is referred to as a so-called lean/rich amplitude, with a rich amplitude being assumed for instance with a lambda value of 0.97 and a lean status being assumed for instance with a lambda value of 1.03, based on a lambda target value of 1.0.

This regulating method is however disadvantageous in that if unexpected changes occur, the enrichment and/or enleanment of the mixture continues after the provided step-by-step increase and/or drop in the lambda value until the exhaust gas probe has redetected a change in the status from lean to rich and/or from rich to lean. The regulating circuit thus responds to changes in a delayed manner.

SUMMARY OF INVENTION

Based on this prior art, the object of the invention is to provide a method for regulating the lambda value of an internal combustion engine, which features an increased control speed in the event of malfunctions so that the predetermined lambda target values are reached more quickly.

To achieve this object, a method according to the claims is proposed in which method the coefficient of the integral component and/or a discontinuous component is added to or subtracted from the integral component if a malfunction deviating from the fluctuation of the exhaust gas composition generated by the lean/rich amplitude is recognized. The discontinuous component is added to counter the malfunction in a targeted manner and/or the coefficient of the integral component is increased to counter the malfunction.

In the event of changes to the exhaust gas composition, this enables the regulator to respond more rapidly and individually to said changes.

The coefficient and/or the discontinuous component can be individually selected according to the size of the malfunction, so that the respective malfunction can be responded to individually.

It is further proposed for the lean/rich amplitude to feature a predetermined cycle time, which identifies the normal operation without malfunctions and which herewith renders a malfunction recognizable, if the time of the actual cycle deviates from the predetermined cycle time.

Alternatively, the oxygen loading in the catalytic converter can also be determined, with a malfunction then being identified, if the value of the oxygen loading deviates from a predetermined value.

BRIEF DESCRIPTION OF THE DRAWINGS

The invention is described in more detail below with reference to a preferred exemplary embodiment. The drawings show detailed versions of.

DETAILED DESCRIPTION OF INVENTION

Figure 1:
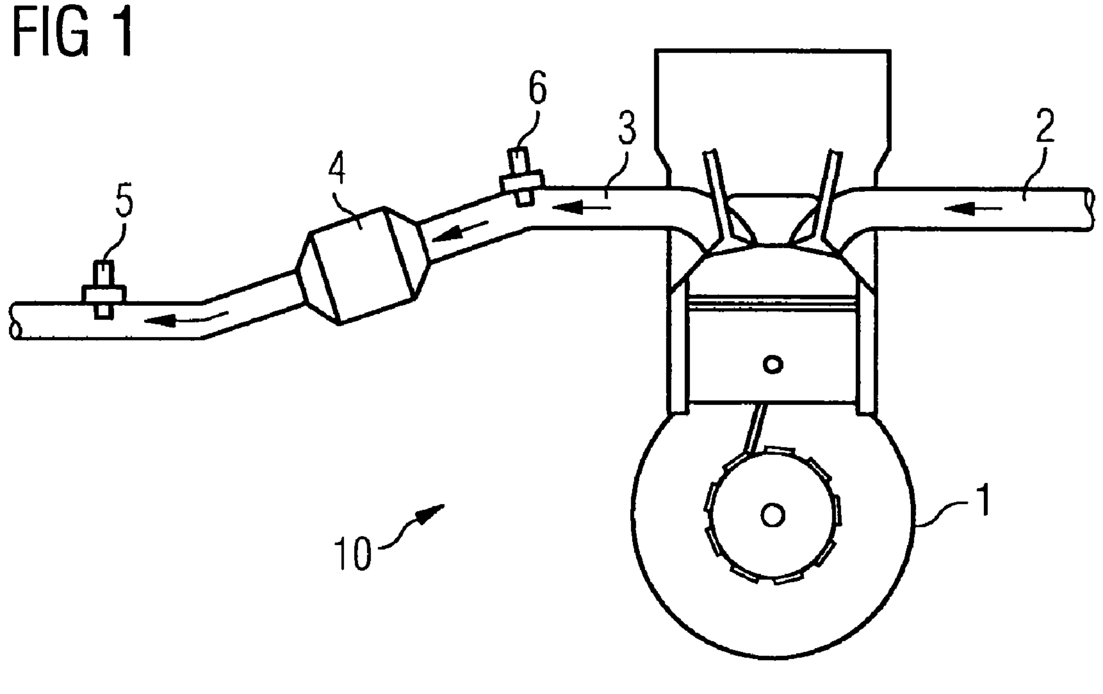
FIG. 1 an internal combustion engine having a crankcase and a catalytic converter arranged downstream thereof, FIG. 2*a* a lean/rich amplitude having a malfunction and an added discontinuous component FIG. 2*b* a lean/rich amplitude having a malfunction and a changed coefficient of the integral component.

An internal combustion engine 10 having a crankcase 1, an inlet channel 2 and an outlet channel 3 can be recognized first in FIG. 1. A catalytic converter 4 is arranged in the outlet channel 3, in which catalytic converter the exhaust gases generated by the internal combustion engine 10 are subsequently treated, so that predetermined HC, NOX and CO values are maintained. A binary lambda probe 6 is arranged in the flow direction of the exhaust gases upstream of the catalytic converter 4, said lambda probe 6 measuring the exhaust gas composition upstream of the catalytic converter 4. A second binary probe 5 is arranged in the flow direction of the exhaust gas downstream of the catalytic converter 4, by means of which second binary probe 5 the composition of the exhaust gases subsequently treated by the catalytic converter 4 can be measured.

Figure 2A:
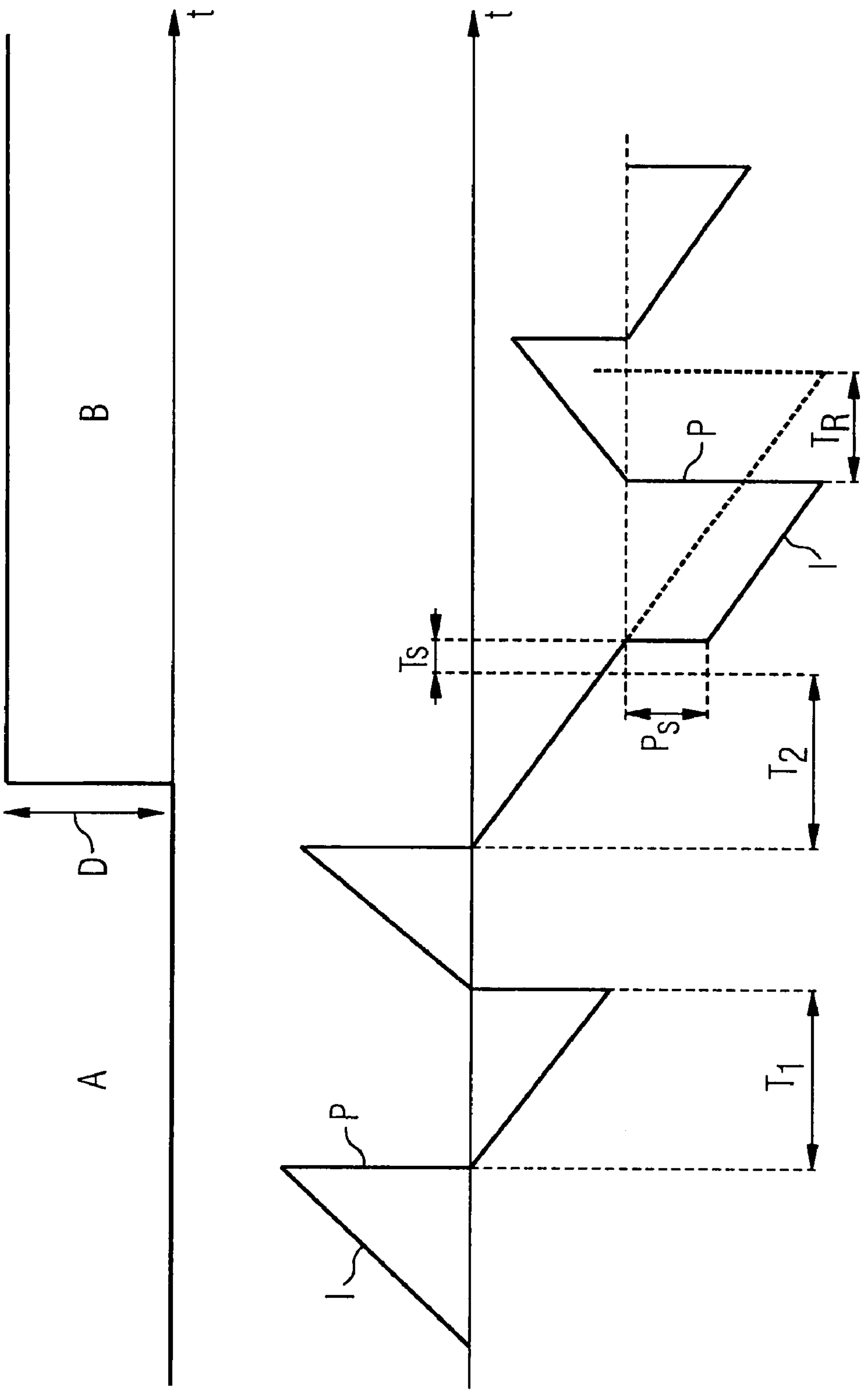

In FIG. 2*a*, a regulating method according to the invention is now shown with an additional discontinuous component $P_s$.

In the upper diagram, the composition of the exhaust gases is shown by way of the timeline, whereas in the lower diagram, the mixture formation generated by the regulating method is likewise shown by way of the timeline. In the upper diagram, the normal status A is first shown at the start, at which a 10% change D in the direction of the rich status of the exhaust gas composition is added. Furthermore, the faulty region is then identified with B. In the lower half of the diagram, the mixture formation then generated can be identified. At the start, normal status A shows how the lean/rich amplitude is added to the lambda target value. The curve firstly increases according to the integral component I, until reaching a mixture concentration of a lambda value of approximately 1.02-1.03. If the status is recognized as rich by the binary lambda probe 6 arranged upstream of the catalytic converter 4, the curve jumps back to the lambda target value of 1.0 by the discontinuous component P and the integration begins anew in the negative direction. The duration of an integral component I is referred to as a cycle time T1. In the normal state, the mixture formation thus constantly fluctuates to and fro between the values 1.03 and 0.97 so that the desired target exhaust gas composition of a lambda value of 1.0 is maintained. If a change D now occurs in the direction of the enriched exhaust gas composition, the status lean is not detected and the predetermined cycle time $Ta_2$ is exceeded. By exceeding the predetermined cycle time $T_2$, the presence of a change D is assumed and after a predetermined tolerance time Ts, a discontinuous component $P_s$ is added to the integral component I. After the discontinuous component $P_s$ the integral component I proceeds with the same coefficient as prior to the discontinuous component $P_s$, until the binary lambda probe 6 arranged upstream of the catalytic converter finally detects a lean status. The mixture formation then jumps to a new lambda target value by the discontinuous component P and the regulation using the lean/rich amplitude begins anew. The obtained control time is the time $T_R$, shown as a time difference between the dashed and solid line.

Alternatively, the same success can be achieved in that after change D has occurred and its recognition of the coefficient of the integral component I is enlarged, i.e. the curve falls more steeply, according to $I_s$ (see FIG. 2 *b*).

Figure 2B:
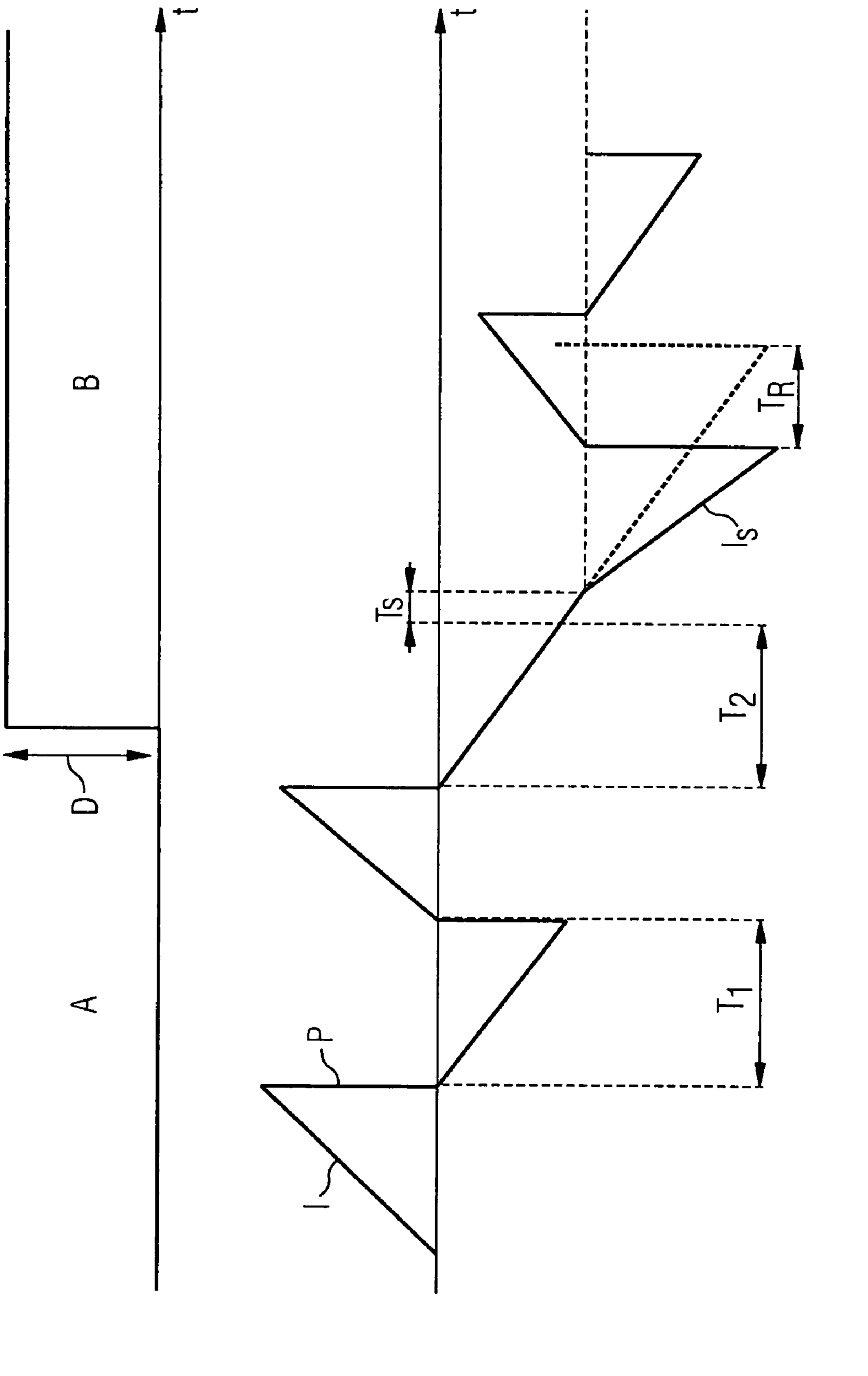

The malfunction is detected in the diagrams FIGS. 2*a* and 2*b* by the deviation of the cycle time, but can nevertheless also be measured alternatively by a deviation in the target oxygen loading in the catalytic converter 4. To this end, the composition of the exhaust gases flowing out of the catalytic converter is also measured by means of the binary probe 5.

The invention claimed is:

1. A method for regulating the lambda value of an internal combustion engine having a catalytic converter for subsequently treating the exhaust gases of the internal combustion engine and a binary lambda probe arranged upstream of the catalytic converter for sensing the exhaust gas composition, comprising:

superimposing a lambda target value having a lean/rich amplitude, the lean/rich amplitude having an integral component and a discontinuous component attributed to the lambda target value;

recognizing a malfunction in the exhaust gas composition that deviates from the fluctuation in the exhaust gas composition generated by the lean/rich amplitude; and enlarging a coefficient of the integral component to counter the malfunction or adding an additional discontinuous component to counter the malfunction to the integral component, in order to provide an increased control speed.

2. The method as claimed in claim 1, further comprising, selecting the coefficient and/or the added discontinuous component individually according to the size of the malfunction so the malfunction can be responded to individually.

3. The method as claimed in claim 2, wherein the lean/rich amplitude comprises a predetermined cycle time and the malfunction is, detected in that the time of the actual cycle deviates from the predetermined cycle time.

4. The method as claimed in claim 3, wherein the $O_2$ loading in the catalytic converter is measured and the malfunction is determined if the value of the $O_2$ loading deviates from a predetermined value.

5. A method for regulating the lambda value of an internal combustion engine having a catalytic converter for subsequently treating the exhaust gases of the internal combustion engine and a binary lambda probe arranged upstream of the catalytic converter for sensing the exhaust gas composition, comprising:

superimposing a lambda target value having a lean/rich amplitude, the lean/rich amplitude having an integral component and a discontinuous component attributed to the lambda target value;

recognizing a malfunction in the exhaust gas composition that deviates from the fluctuation in the exhaust gas composition generated by the lean/rich amplitude; and enlarging a coefficient of the integral component to counter the malfunction and adding an additional discontinuous component to counter the malfunction to the integral component, in order to provide an increased control speed.

6. The method as claimed in claim 5, further comprising, selecting the coefficient and/or the added discontinuous component individually according to the size of the malfunction so the malfunction can be responded to individually.

7. The method as claimed in claim 6, wherein the lean/rich amplitude comprises a predetermined cycle time and the malfunction is detected in that the time of the actual cycle deviates from the predetermined cycle time.

8. The method as claimed in claim 7, wherein the $O_2$ loading in the catalytic converter is measured and the malfunction is determined if the value of the $O_2$ loading deviates from a predetermined value.

* * * * *